United States Patent [19]
Koizumi et al.

[11] Patent Number: 5,659,609
[45] Date of Patent: Aug. 19, 1997

[54] ECHO CANCELLER AND WAVEFORM-DISTORTION COMPENSATION DEVICE

[75] Inventors: Nobukazu Koizumi; Mitsuo Kakuishi; Yutaka Awata, all of Kawasaki, Japan

[73] Assignee: Fujitsu Limited, Kanagawa, Japan

[21] Appl. No.: 503,620

[22] Filed: Jul. 18, 1995

[30] Foreign Application Priority Data

Sep. 5, 1994 [JP] Japan .................................. 6-211416

[51] Int. Cl.⁶ .................................................. H04B 3/23
[52] U.S. Cl. ............................ 379/410; 370/286; 370/290; 379/3
[58] Field of Search ........................ 379/410, 411, 379/406, 3; 370/32.1, 286, 289, 290, 291

[56] References Cited

U.S. PATENT DOCUMENTS

| | | | |
|---|---|---|---|
| 4,605,826 | 8/1986 | Kanemasa | 370/32.1 |
| 4,695,998 | 9/1987 | Schollmeir | 370/32.1 |
| 4,792,940 | 12/1988 | Hiraguchi | 370/32.1 |
| 4,965,823 | 10/1990 | Nakagawa et al. | 379/411 |
| 4,972,467 | 11/1990 | Nakagawa et al. | 379/411 |
| 5,018,134 | 5/1991 | Kakubo et al. | 370/32.1 |
| 5,084,865 | 1/1992 | Koike | 370/32.1 |
| 5,353,279 | 10/1994 | Koyama | 379/410 X |
| 5,375,147 | 12/1994 | Awata et al. | 379/411 X |

FOREIGN PATENT DOCUMENTS 3-171835   7/1991   Japan .

OTHER PUBLICATIONS

Messerschmitt, David G., "Asynchronous and Timing Jitter Insensitive Data Echo Cancellation", IEEE Transactions on Communications, vol. COM-34, No. 12, Dec. 1986, pp. 1209–1217.

Primary Examiner—Krista M. Zele
Assistant Examiner—Devendra T. Kumar
Attorney, Agent, or Firm—Helfgott & Karas, P.C.

[57] ABSTRACT

An echo canceller is disclosed which generates an echo replica based on a transmit signal to cancel an echo. The echo canceller includes a linear echo canceller circuit for generating an echo replica of the transmit signal in the absence of distortion. The echo canceller further includes a waveform-distortion compensation circuit, coupled with the linear echo canceller circuit, for generating an echo replica for compensating waveform distortion occurred in an echo response when the transmit signal is distorted. In the echo canceller, the echo is canceled by use of the echo replica generated in the linear echo canceller circuit in the absence of distortion in the transmit signal, and is canceled by use of the echo replica generated in the waveform-distortion compensation circuit when the transmit signal is distorted.

13 Claims, 12 Drawing Sheets

ECHO CANCELLER AND WAVEFORM-DISTORTION COMPENSATION DEVICE

BACKGROUND OF THE INVENTION

1. Field of the Invention

The present invention generally relates to an echo canceller and a waveform-distortion compensation device, which are applied to a line-termination unit, etc., in a digital subscriber-loop transmission.

The present invention relates, more particularly, to an echo canceller including a waveform-distortion compensation device which compensates for a distortion of an echo waveform (transmit waveform), the distortion occurring by jitter of a recovered transmit clock in a unit in which a digital phase-locked loop (DPLL) is used for timing recovery of a transmit-and-receive clock.

2. Description of the Prior Art

A description of the prior art will be given in which the echo canceller is applied to the subscriber-side line-termination unit in the digital subscriber-loop transmission.

FIG. 1 shows a configuration of a conventional line-termination unit in a subscriber facility. In FIG. 1, a transmission module 31 converts transmit data to a transmit code a1 and transmits it in an analog transmit signal form in synchronization with a transmit clock. A hybrid (HYB) circuit 32 converts the transmit signal and a receive signal between a 2-wire local line and a 4-wire subscriber facility. For example, the HYB circuit 32 transits the transmit signal from the transmission module 31 to the local line, and also transits the receive signal from the local line to a reception section. In this way, the HYB circuit 31 switches the transmit signal and the receive signal in respective directions.

In an ideal design of the HYB circuit 32, the transmit signal from the transmission module 31 is transmitted to the local line, so that the transmit signal does not affect the reception section. However, in a practical use of the HYB circuit, there is an impedance mismatch causing energy to be reflected. Therefore, a portion of the transmit signal comes around to the reception section through the HYB circuit 32 to cause an echo E.

The echo E through a HYB circuit pass is added to the receive signal from the local line, and both the echo E and the receive signal are supplied to an analog-to-digital converter (A/D converter) 33 to convert to a digital signal.

The line-termination unit includes an echo canceller 34 for canceling the echo E. In the following, operation of the echo canceller 34 will be described by referring to FIGS. 2 and 3. FIG. 2 shows an illustration for explaining a relationship between an impulse response of the echo and tap coefficients of the echo canceller. FIG. 3 shows an illustration for explaining a variation of the tap coefficient based on a change of a sampling phase. The echo canceller 34 generates an echo replica e based on the transmit code a1 from the transmission module 31. The echo canceller 34 comprises a linear echo canceller LEC for canceling a linear component of the impulse response of the echo shown in FIG. 2, and a phase compensation circuit PHC for compensating the change of the sampling phase of the echo shown in FIG. 3. The linear echo canceller LEC has tap coefficients C1, C2, . . . , C6, . . . shown in FIG. 2, and can cancel an echo response in a normal operation, i.e., no jitter of the line-termination unit.

The echo E in a received signal from the A/D converter 33 is selectively canceled by subtracting the echo replica e generated by the echo canceller 34 from the received signal at a subtraction circuit 35. A signal from which the echo was eliminated is produced as received data from a line-equalizer block 36.

A digital phase-locked loop (DPLL) circuit 37 recovers a timing based on timing information of the received data produced from the line-equalizer block 36. The DPLL circuit 37 corrects a frequency error and controls a sampling clock (receive clock) of the A/D converter 33 and the transmit clock of the transmission module 31.

FIG. 4A shows a block diagram of a configuration of the transmission module 31. FIG. 4B shows time charts for explaining an operation of the transmission module 31 shown in FIG. 4A. The transmission module 31 comprises a transmit-code converter 41, a digital-to-analog-conversion (DAC) code generator 42, a digital-to-analog (D/A) converter 43, a smoothing filter 44, and a line driver 45.

The transmit-code converter 41 converts the transmit data to the transmit code a1 (for example, a transmit code such as 2B1Q code). The DAC-code generator 42 generates a DAC code (digital data) for D/A-converting of the transmit code a1. The D/A converter 43 converts the DAC code from a digital form to an analog form. The smoothing filter 44 smoothes an analog output of the D/A converter 43. The line driver 45 transmits an output of the smoothing filter 44 to the local line as the transmit signal.

The DAC-code generator 42 is supplied with the transmit clock in synchronization with the recovered timing from the DPLL circuit 37. And, as shown in FIG. 4B, the DAC-code generator 42 generates the DAC code which rises and falls at a rising timing of the transmit clock. Therefore, a pulse width of the transmit signal is determined by a period of the transmit clock.

Next, a description will be given of a problem which occurs in the above prior echo canceller.

Since the DPLL circuit 37 is constructed with digital circuits, jitter occurs in the recovered clock due to a phase jump in a DPLL operation. In general, the jitter occurs once at a single clock of certain sequential clocks in a given period, and an occurrence of the jitter is repeated at the given period.

FIG. 5 shows an example of a DAC-code waveform when the transmit clock has jitter. When such jitter occurs in the clock (transmit clock) generated in the DPLL circuit 37, the pulse width of the transmit signal (DAC code) from the transmission module 31 changes as shown in FIG. 5. For example, when no jitter occurs in the transmit clock, the pulse width of the DAC code is shown in a solid line in FIG. 5. When the jitter occurs in a forward direction of the transmit clock, the pulse width of the DAC code is shortened as shown in a dotted line. And when the jitter occurs in a backward direction of the transmit clock, the pulse width of the DAC code is extended as shown in a one-dotted chain line.

As mentioned above, when the pulse width of the transmit signal changes, the waveform of the impulse response of the echo also changes according to the change of the pulse width. The change of the impulse response is carried out instantaneously, since only one jitter occurs in the transmit clock in the given period. Therefore, the conventional linear echo canceller, which may cancel the echo not including jitter, cannot track a coefficient update for the change of the impulse response of the echo. Thus, the linear echo canceller cannot generate a proper echo replica for the transmit signal (DAC code) which includes the jitter. As a result, at a receiving end, a portion of the echo (remaining echo $\epsilon$), which was not canceled, increases.

Furthermore, the clock including the jitter from the DPLL circuit 37 changes the sampling phase in the A/D converter 33 in the receive section. Therefore, as shown in FIG. 3, the variation of the sampling phase changes the tap coefficients of the echo canceller. For example, in FIG. 3, when no jitter occurs, the tap coefficient is represented by "Cn". When the jitter having a width Δ occurs in the forward direction, the corresponding tap coefficient is $$Cn^{**}=Cn-Pn.$$

When the jitter having the width Δ occurs in the backward direction, the corresponding tap coefficient is $$Cn^{*}=Cn+Pn.$$

By the above change of the tap coefficient due to the variation of the sampling phase in the A/D converter 33, generation of the proper echo replica in the echo canceller 34 is interrupted. To eliminate this interruption, the echo canceller 34 usually includes the phase compensation circuit PHC for compensating the variation of the sampling phase of the echo.

On the other hand, to prevent the impulse response from being changed by the transmit signal having the jitter (namely to prevent the echo from being distorted), for example, the following method, is applicable. In the following method, the transmission module is improved so as not to distort the transmit signal (namely, so as to keep the pulse width of the transmit signal constant) for the jitter of the transmit clock generated in the DPLL operation.

FIG. 6 shows an example of the output of the DAC code in the case of applying the new method for preventing distortion in the transmit signal. In the example, one transmit code is changed by a small period of the jitter width of the transmit clock with extending to two sampling periods. A part of the changed transmit code in the latter sampling period is convolutionally multiplied with the DAC code in the next sampling period to produce it as the DAC code. When the jitter occurs in the transmit clock, the convolutionally-multiplying timing for the DAC code in the next sampling period is shifted by one jitter width in a jitter direction. In this way, when the jitter occurs in the transmit signal, though the phase of the transmit signal is changed, the waveform of the transmit signal is not distorted.

However, there is a problem that the above method, which causes no distortion in the transmit waveform when the jitter occurs in the transmit clock, requires a complex configuration of the transmission module.

SUMMARY OF THE INVENTION

It is an object of this invention to provide a waveform-distortion compensation device in a echo canceller. By using the echo canceller, a configuration of the transmission module may be simplified by permitting a transmit signal to be distorted. A waveform distortion of an echo response according to the distortion of the transmit signal may be compensated by the waveform-distortion compensation device located in the echo canceller. The configuration of the waveform-distortion compensation device is also simple. By using the unit, even if the distortion occurs in the transmit signal due to jitter, echo canceling performance is not degraded. This permits the disadvantages described above to be eliminated.

According to the present invention, to simplify the configuration of the transmission module, the transmit signal is distorted due to the litter in the transmit clock, etc., and the waveform-distortion compensation device is located in the echo canceller to compensate the distortion of the echo.

The object described above is achieved by an echo canceller for generating an echo replica based on a transmit signal to cancel an echo, the echo canceller comprising: a linear echo canceller circuit for generating an echo replica of the transmit signal in the absence of distortion; and a waveform-distortion compensation circuit, coupled with the linear echo canceller circuit, for generating an echo replica for compensating waveform distortion occurred in an echo response when the transmit signal is distorted; wherein the echo is canceled by use of the echo replica generated in the linear echo canceller circuit in the absence of distortion in the transmit signal, and is canceled by use of the echo replica generated in the waveform-distortion compensation circuit when the transmit signal is distorted.

The object described above is also achieved by the echo canceller mentioned above, wherein the waveform-distortion compensation circuit comprises: a distortion-tap-coefficient storage circuit for storing a set of tap coefficients for a distorted echo response due to the distortion of the transmit signal; and a selection circuit for replacing a tap coefficient corresponding to a tap through which the distortion of the transmit signal transits in the linear echo canceller circuit, to a corresponding one of the tap coefficients stored in the distortion-tap-coefficient storage circuit so as to permit a convolutional operation and a coefficient updating operation.

The set of tap coefficients stored in the distortion-tap-coefficient storage circuit comprises a set of tap coefficients for a pulse width of the transmit signal which is extended due to the distortion of the transmit signal and a set of tap coefficients for a pulse width of the transmit signal which is shortened due to the distortion of the transmit signal.

The above-mentioned echo canceller further comprises a subtracting circuit for subtracting the echo replica generated in the linear echo canceller circuit and the echo replica generated in the waveform-distortion compensation circuit from the echo. By the subtracting operation, the echo is easily canceled.

The object described above is also achieved by the echo canceller mentioned above, wherein the waveform-distortion compensation circuit comprises: a differential tap-coefficient storage circuit for storing a set of differential tap coefficients which differentiate between a distorted echo response when the transmit signal is distorted and a normal echo response generated in the absence of distortion in the transmit signal; a differential replica generation circuit for generating, when compensating the waveform distortion of the echo response, a differential echo replica for a distortion component of the echo response by use of the differential tap-coefficient; and an adding circuit for adding the differential echo replica to the echo replica generated in the linear echo canceller circuit to generate an echo replica for compensating the waveform distortion of the echo response.

In the above-mentioned echo canceller, the set of differential tap coefficients stored in the differential tap-coefficient storage circuit comprises a set of differential tap coefficients for a pulse width of the transmit signal which is extended due to the distortion of the transmit signal and a set of differential tap coefficients for a pulse width of the transmit signal which is shortened due to the distortion of the transmit signal.

And the following method may be also applied. The set of differential tap coefficients stored in the differential tap-coefficient storage circuit is one of a set of differential tap coefficients for a pulse width of the transmit signal which is extended due to the distortion of the transmit signal and a set of differential tap coefficients for a pulse width of the transmit signal which is shortened due to the distortion of the transmit signal, the non-stored one of the two sets of differential tap coefficients being generated by inverting codes of the differential tap coefficients stored in the differential tap coefficient storage circuit.

The object described above is also achieved by a waveform-distortion compensation device, to be coupled with an echo canceller, for compensating waveform distortion of an echo response when a transmit signal is distorted, the device comprising: a differential tap-coefficient storage circuit for storing a set of differential tap coefficients which differentiate between a distorted echo response when the transmit signal is distorted and a normal echo response generated in the absence of distortion in the transmit signal; and a differential replica generation circuit for generating, when compensating the waveform distortion of the echo response, a differential echo replica for a distortion component of the echo response by use of the differential tap-coefficient.

Accordingly, the echo canceller permits the transmit signal to be distorted by jitter of a transmit clock, etc., and the waveform distortion of the echo response when the transmit signal is distorted may be compensated. Therefore, this makes it possible to simplify transmission circuitry.

According to the echo canceller, since operation of the waveform-distortion compensation device is the same as that of the linear echo canceller, the same operation circuit may be used for both operations. Therefore, an additional circuit for realizing the echo canceller including the waveform-distortion compensation device may be small.

Other objects and further features of the present invention will be apparent from the following detailed description when read in conjunction with the accompanying drawings.

DESCRIPTION OF THE PREFERRED EMBODIMENTS

Figure 1:
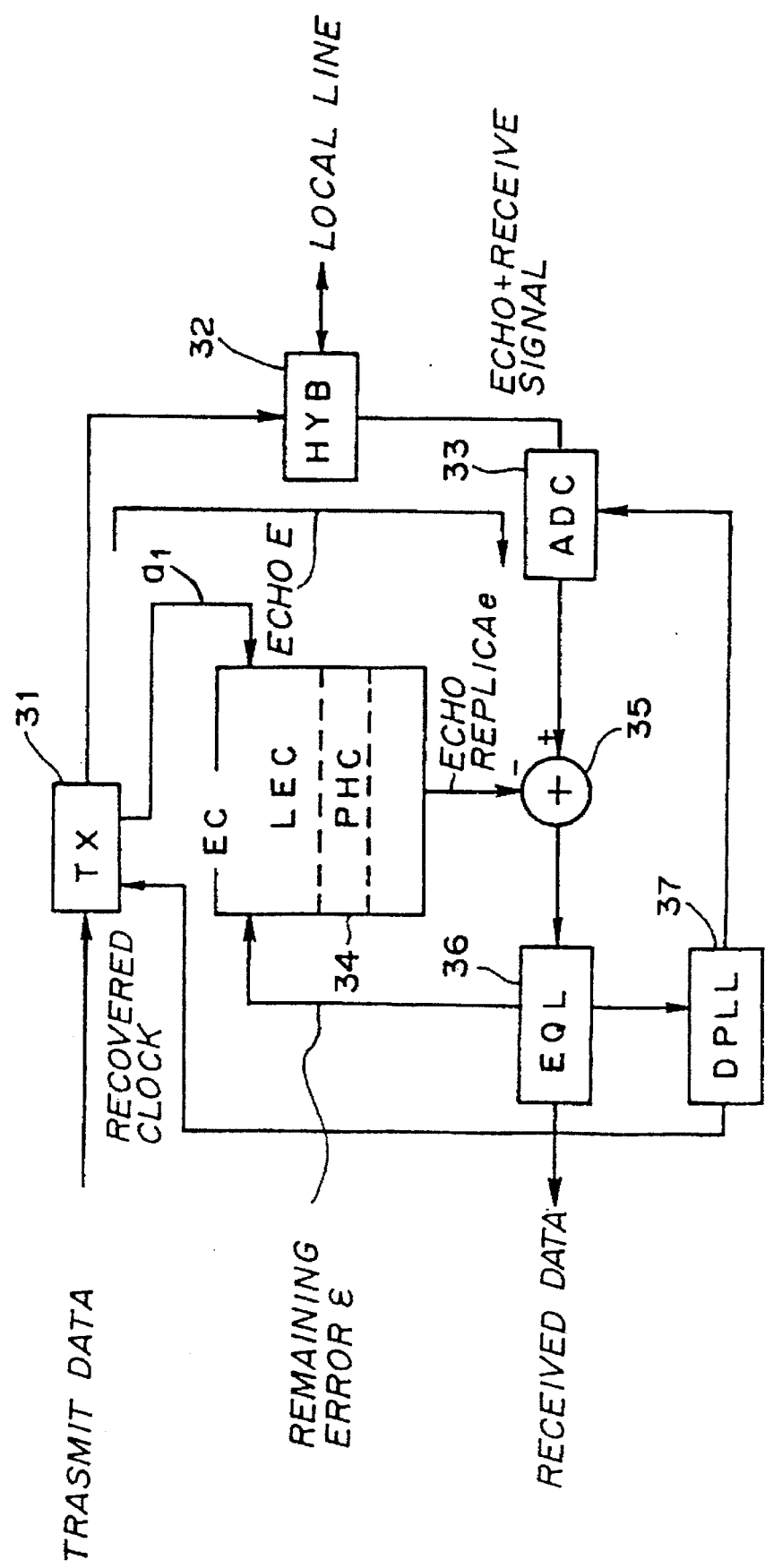
FIG. 1 shows a configuration of a conventional line-termination unit in a subscriber facility.
Figure 2:
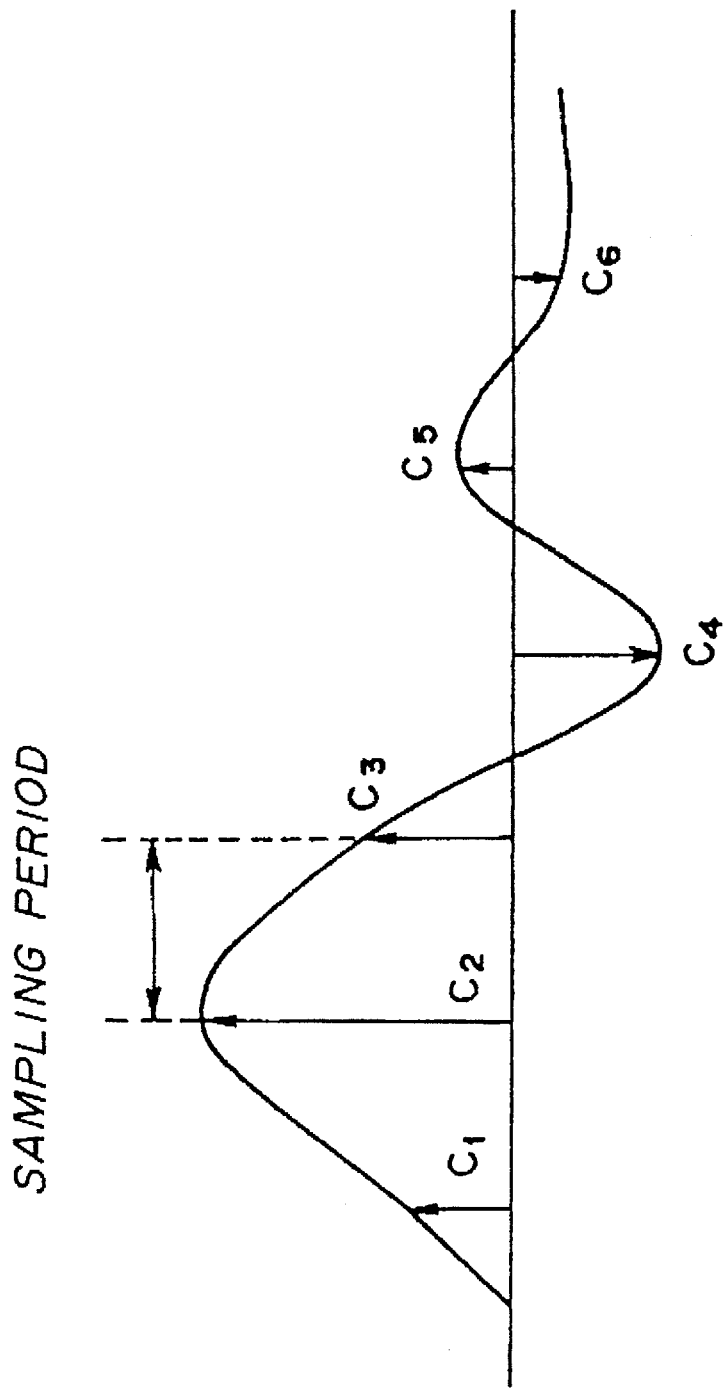
FIG. 2 shows an illustration for explaining a relationship between an impulse response of an echo and tap coefficients of an echo canceller.
Figure 3:
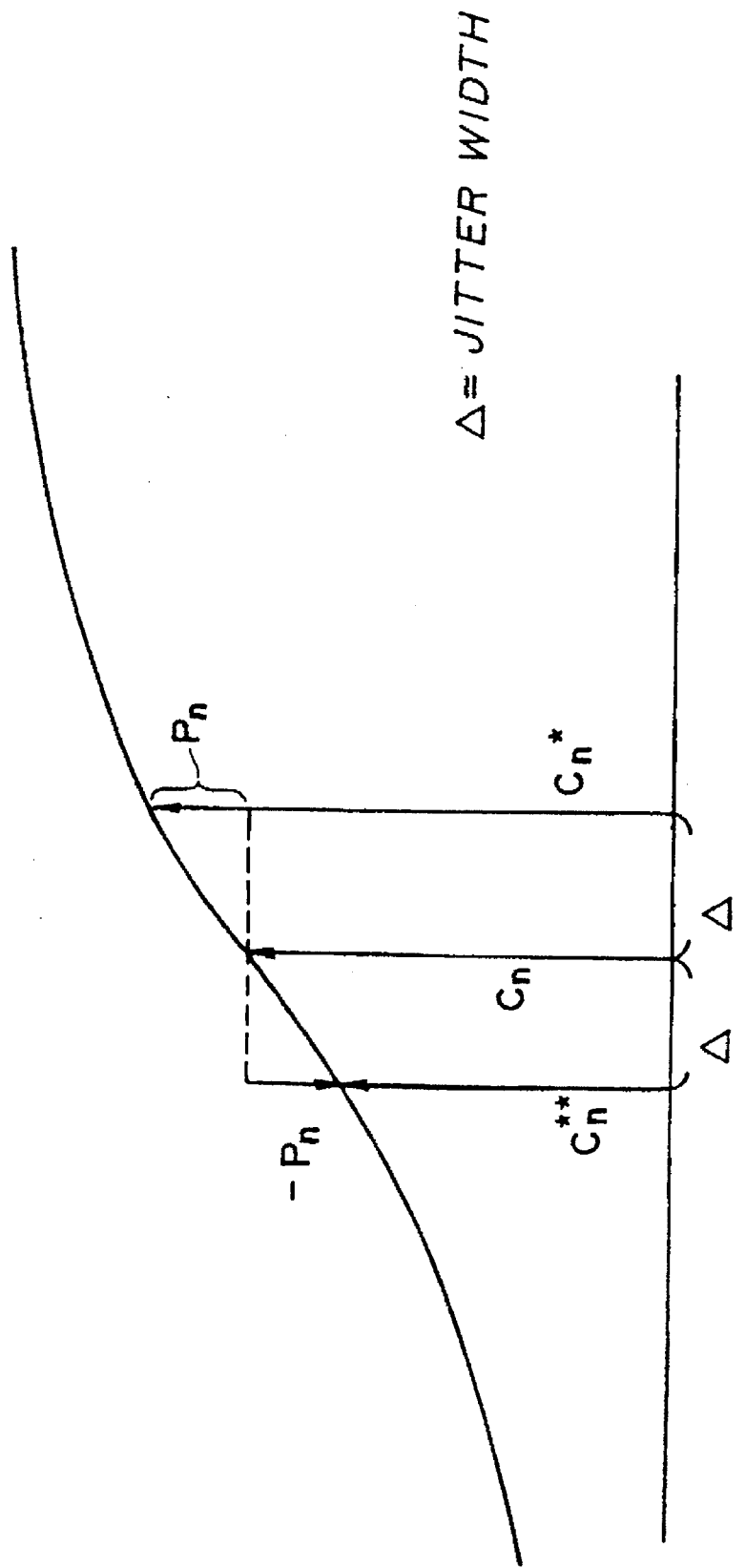
FIG. 3 shows an illustration for explaining a variation of the tap coefficient based on a change of a sampling phase.
Figure 4A:
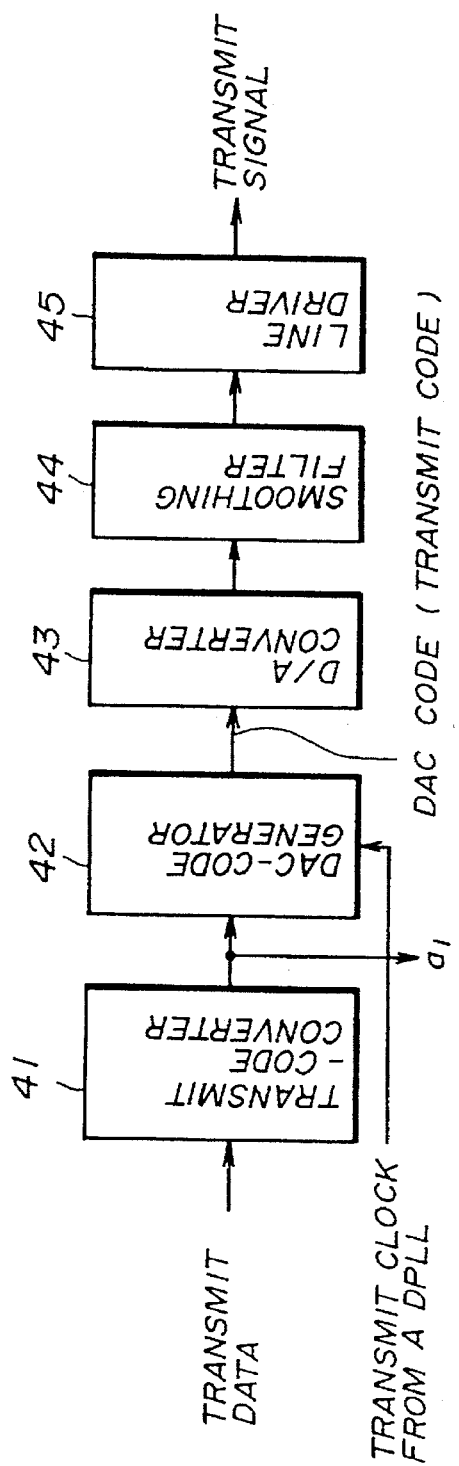
FIG. 4A shows a block diagram of a configuration of a transmission module in the line-termination unit shown in FIG. 1.
Figure 4B:
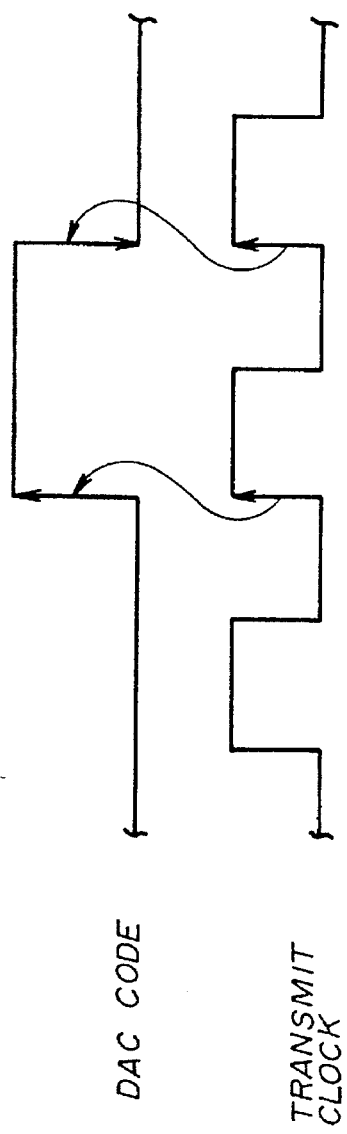
FIG. 4B shows time charts for explaining an operation of the transmission module shown in FIG. 4A.
Figure 7:
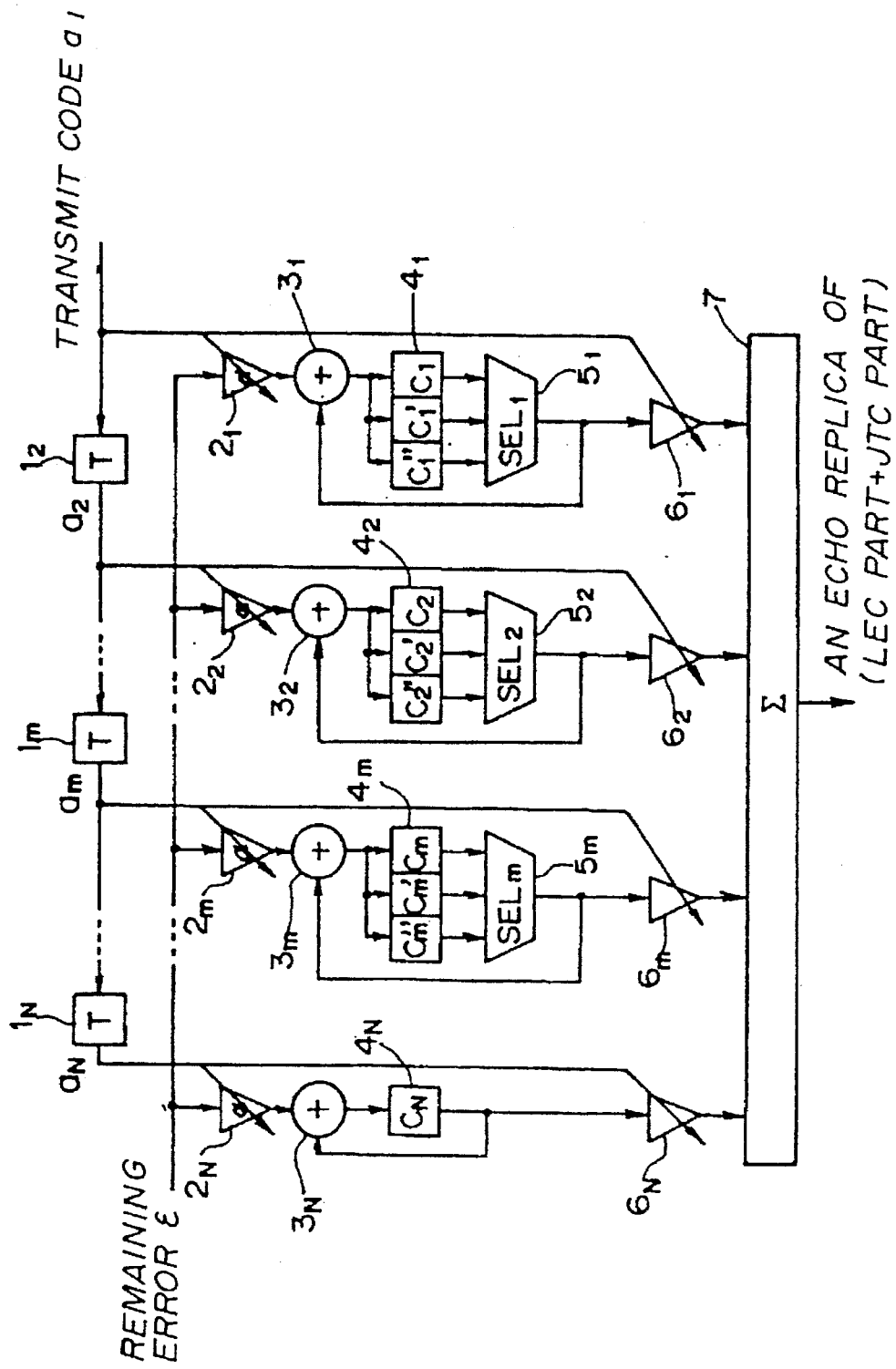
FIG. 7 shows a schematic diagram of a first embodiment of a waveform-distortion compensation device in an echo canceller according to the present invention.

First, a description will be given of a first embodiment of a waveform-distortion compensation device in an echo canceller according to the present invention, by referring to FIG. 7. FIG. 7 shows a schematic diagram of the first embodiment of the waveform-distortion compensation device in the echo canceller according to the present invention. This drawing shows the waveform-distortion compensation device according to the present invention as applied to the echo canceller used in the line-termination unit of the digital subscriber-loop transmission shown in FIG. 1. By applying the waveform-distortion compensation device shown in FIG. 7 to the echo canceller, the transmit signal is permitted to be distorted by the jitter of the transmit clock. Therefore, the configuration of the transmission module of the line-termination unit may be simplified. Also, by locating the waveform-distortion compensation device in the echo canceller's side, the waveform distortion of the echo may be compensated.

Figure 8:
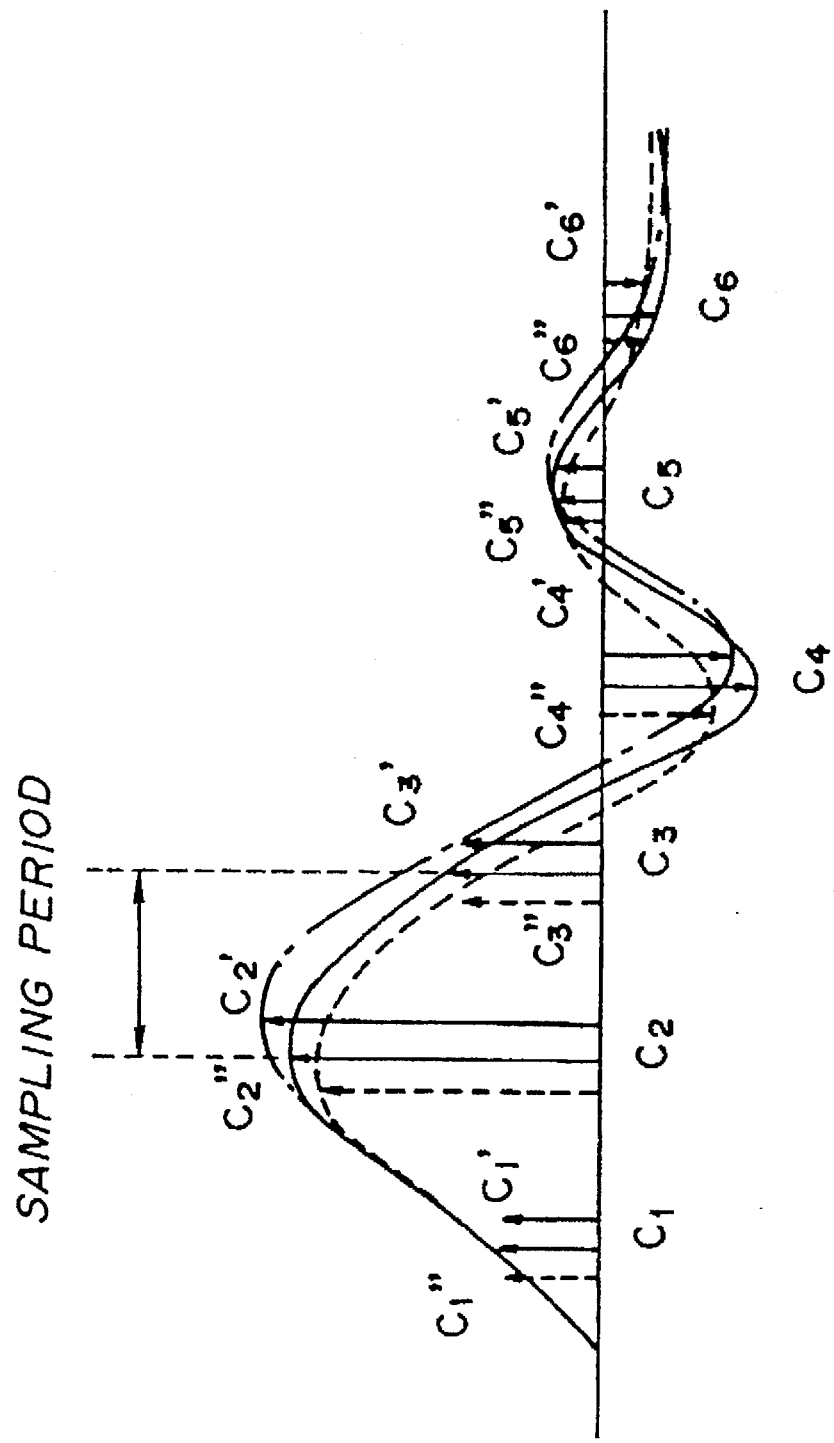
FIG. 8 shows an illustration for explaining how the distortion of the transmit signal due to the jitter of the transmit clock affects the waveform of the echo.

In FIG. 7, the waveform-distortion compensation device (JTC) and the conventional linear echo canceller (LEC) are integrated in one device. In this device, the transmit code a1 from the transmission module is sequentially supplied to delay elements $1_2$ to $1_N$ to respectively generate delayed transmit codes $a_2$ to $a_N$. Tap coefficients are stored in coefficient memories $4_1$ to $4_N$. Usually, the coefficient memories $4_1$ to $4_N$ are storing tap coefficients $C_1$ to $C_N$, respectively, for echo responses including no waveform distortion. The coefficient memories $4_1$ to $4_m$ of the coefficient memories $4_1$ to $4_N$ store two kinds of tap coefficients $C_1'$ to $C_m'$, $C_1''$ to $C_m''$ for echo responses including waveform distortion (namely, tap coefficients for forward/backward jitter) in addition to the tap coefficients $C_1$ to $C_m$. A value of m is set to a tap number in which the component of a waveform distortion shown in FIG. 8 is decreased to being negligible. The two kinds of tap coefficients $C_1'$ to $C_m'$, $C_1''$ to $C_m''$ will be discussed later.

The coefficient memories $4_1$ to $4_m$ are respectively connected to selectors $5_1$ to $5_m$. Each of selectors $5_1$ to $5_m$ selects one of three kinds of tap coefficients $C_h$, $C_h'$, $C_h''$ in the coefficient memory $4_h$ (where h is included in the series of 1 to m). At each tap end, multipliers $6_1$ to $6_N$ are located. In each of multipliers $6_1$ to $6_N$, the tap coefficient $C_n$ (for coefficient memories $4_1$ to $4_m$, one of the tap coefficients $C_h$, $C_h'$, $C_h''$, h inclusive of 1 to m) in the coefficient memory $4_n$ is multiplied with the transmit code $a_n$ from the corresponding tap $1_n$ (n inclusive of 1 to N). Multiplied values from the multipliers $6_1$ to $6_N$ are totally summed in a summation circuit 7 to produce a convolutional result.

Tap further includes multipliers $2_1$ to $2_N$ and adders $3_1$ to $3_N$. In each of the multiplies $2_1$ to $2_N$, a remaining error $\epsilon$ is multiplied with a constant coefficient $\alpha$ (step gain) and the corresponding transmit code $a_n$. In each of the adders $3_1$ to $3_N$, the tap coefficient $C_n$ (for coefficient memories $4_1$ to $4_m$, one of the tap coefficients $C_h$, $C_h'$, $C_h''$) is added to an output of the corresponding multiplier $2_n$ to update the tap coefficient in the corresponding coefficient memory $4_n$.

As mentioned above, the waveform-distortion compensation device according to the present invention has the tap coefficients $C_h'$, $C_h''$, and is constructed such that the coefficient memories $4_1$ to $4_m$ for storing the tap coefficients $C_h'$, $C_h''$ and the selectors $5_1$ to $5_m$ for selecting one of the tap coefficients are added to the conventional linear echo canceller for the echo response not being distorted.

Figure 5:
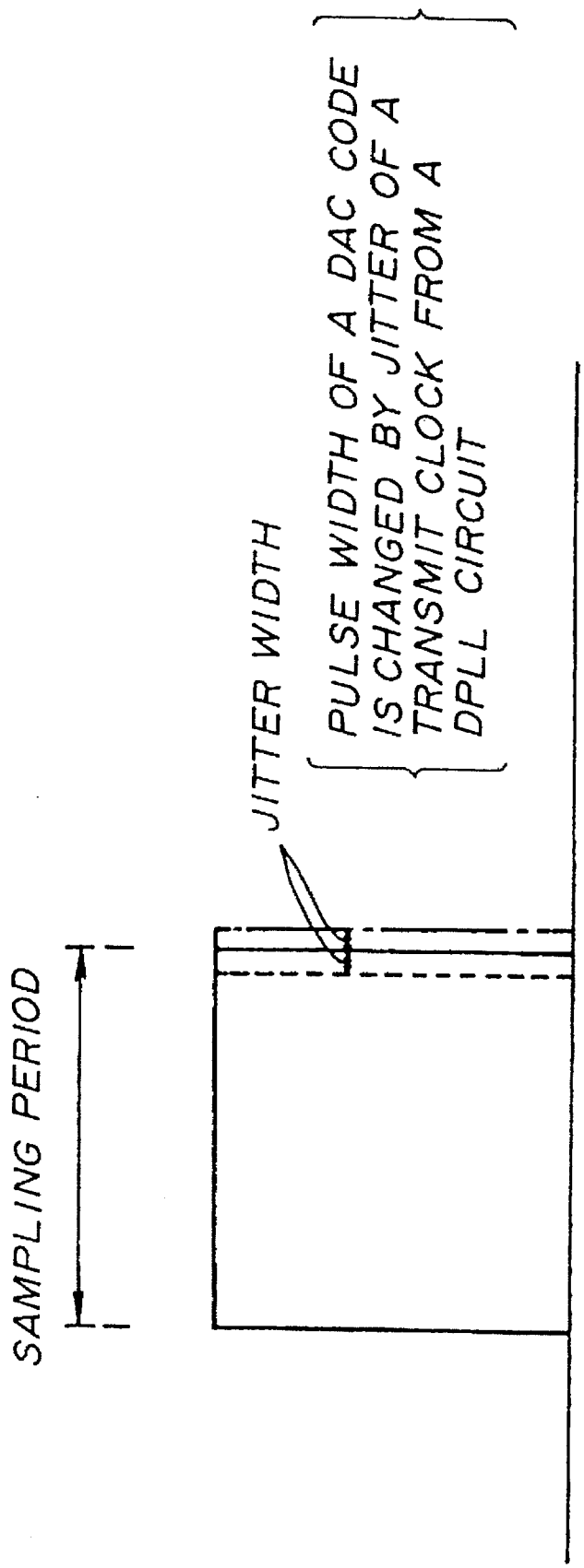
FIG. 5 shows an example of a DAC-code waveform when a transmit clock has jitter.
Figure 6:
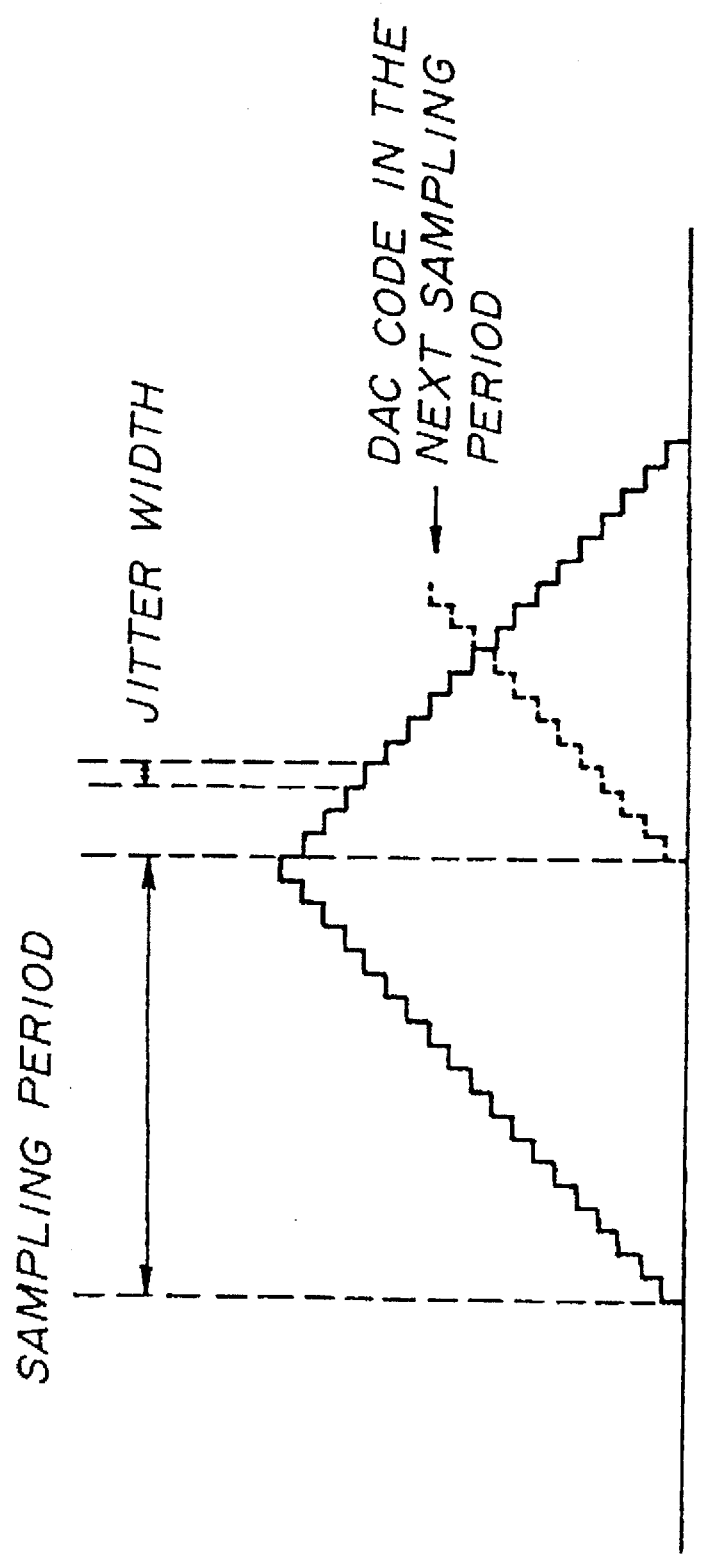
FIG. 6 shows an example of an output of the DAC code when applying a new method for causing no distortion in a transmit signal.

Next, a description will be given of an operation of the first embodiment of the waveform-distortion compensation device according to the present invention. In FIG. 5, the example is shown of the DAC-code waveform when jitter occurs in the transmit clock in the transmission module 31 shown in FIG. 1. As mentioned before, the waveform of the transmit signal is permitted to be distorted due to the jitter of the transmit clock, namely fluctuation of the pulse width of the transmit signal may be permitted. The solid line represents the waveform of the transmission signal when no jitter occurs, the dotted line represents the waveform thereof in the case of forward jitter, and the one-dotted chain line represents the waveform thereof in the case of backward jitter.

FIG. 8 shows an illustration for explaining how the distortion of the transmit signal due to the jitter of the transmit clock effects the waveform of the echo. A solid line represents an echo response in the case of no jitter in the transmit signal (corresponding to the echo response shown in FIG. When the pulse width of the transmit signal is extended by the jitter of the transmit clock as shown in the one-dotted chain line of FIG. 5, the echo response represented by the solid line is changed to an echo response represented by the one-dotted chain line as shown in FIG. 8. When the pulse width of the transmit signal is shortened by the jitter of the transmit clock as shown in the dotted line of FIG. 5, the echo response represented by the solid line is changed to an echo response represented by the dotted line as shown in FIG. 8. Therefore, the sets of tap coefficients of the echo response in the case of no distortion, $C_1, C_2, \ldots, C_6, \ldots$, changes to $C_1', C_2', \ldots, C_6', \ldots$ in the echo response for the extended pulse transmit signal, and to $C_1'', C_2'', \ldots, C_6'', \ldots$ in the echo response for the shortened pulse transmit signal. In FIG. 8, arrows corresponding to $C_n$, $C_n'$ and $C_n''$ (n=1 to 6) coincide. In this instance, the echo response is sampled in the sampling clock in the absence of jitter.

The waveform-distortion compensation device according to the present invention compensates the fluctuation of the echo response as shown in FIG. 8. A compensating operation in the waveform-distortion compensation device is carried out by using the fact that there is a linear relation between the waveform distortion and the transmit code. For example, when the transmit code is 2B1Q, the code represents ±1, ±3. FIG. 8 is a drawing corresponding to the code +1. Therefore, even if the waveform distortion occurs, the echo response corresponding to the codes +3, −3 becomes +3, −3 times the echo response in the case of the code being +1. Therefore, waveform-distortion compensation device has the two kinds of tap coefficients $C_h'$, $C_h''$, and selects one of these tap coefficients according to the direction of the jitter. An echo replica for the distortion component is generated by multiplying the sequentially shifted transmit codes when the pulse width is changed by the tap coefficients in the convolutional method. Accordingly, when the waveform distortion occurs in the transmit signal, one of the tap coefficients $C_h'$, $C_h''$ is used instead of the tap coefficient $C_h$ of the linear echo canceller to compensate the waveform distortion by the convolutional method.

In further detail, when no jitter occurs in the transmit clock, the operation of the waveform-distortion compensation device shown in FIG. 7 is the same as that of the conventional linear echo canceller. In the operation, each of the selectors $5_1$ to $5_m$ selects the tap coefficient $C_h$ corresponding to the echo response having no jitter. Then, to produce the echo replica e, the convolutional operation is carried out by using the multipliers $6_1$ to $6_N$ and the total summation circuit 7, as follows:

echo replica $e=\Sigma(a_i \times C_i)$, where $\Sigma$ means a total summation of $(a_i \times C_i)$ when i is changed from 1 to N. The update operation of the tap coefficient is carried out by using the multipliers $2_1$ to $2_N$ and the adders $3_1$ to $3_N$ with the remaining error $\epsilon$ as follows:

$C_i = C_i + \alpha \times a_i \times \epsilon$, where $\alpha$ is a constant value. These updated tap coefficients replace the latest tap coefficients $C_1$ to $C_N$ of the coefficient memories $4_1$ to $4_N$.

When jitter occurs in the transmit clock, only at that time, the tap coefficient $C_h$ is switched to the tap coefficient $C_1'$ or $C_N''$ by the selector. In the given period, only one jitter in the transmit clock occurs. At that time, the transmit code $a_1$ is sequentially shifted through the delay elements $1_2$ to $1_N$ in each sampling period. When the sequentially shifted transmit code including the waveform distortion is represented by $a_k$, the selector $5_k$ switches the tap coefficient from $C_k$ to $C_k'$ or $C_k''$ according to the direction of the jitter. Therefore, the convolutional operation is carried out as follows:

1. for the jitter extending the pulse width of the transmit signal:

echo replica $e = *\Sigma(a_i \times C_i) + a_k \times C_k'$, where $*\Sigma$ means a total summation of $(a_i \times C_i)$ when i is changed from 1 to N except for k; and 2. for the jitter shortening the pulse width of the transmit signal:

echo replica $e = *\Sigma(a_i \times C_i) + a_k \times C_k''$, where $*\Sigma$ means a total summation of $(a_i \times C_i)$ when i is changed from 1 to N except for k. By using the echo replica e, the waveform distortion may be compensated. In this time, the updating operation of the tap coefficient is carried out with the remaining error $\Sigma$ at this instance as follows:

$C_i = C_i + \alpha \times a_i \times \epsilon$ $(i \neq k)$, $C_k' = C_k' + \alpha \times a_k \times \epsilon$, or $C_k'' = C_k'' + \alpha \times a_k \times \epsilon$.

In this way, in the waveform-distortion compensation device, the transmit code having the jitter is sequential shifted through the delay elements $1_2$ to $1_N$, and the convolutional operation and the coefficient updating operation are carried out by using the tap coefficients corresponding to the distorted echo response of the distorted transmit signal. Therefore, in addition to the situation in which a single jitter occurs in the sampling period i=1 to i=m, the waveform-distortion compensation may be effectively performed when a plurality of jitter occurs in the same sampling period by the waveform-distortion compensation device. In this case, as the transmit code corresponding to the each jitter is sequentially shifted through the delay elements $1_2$ to $1_N$, the selector of the tap to which the transmit code having the jitter is provided switches successively the tap coefficient $C_h$ to the tap coefficient Ch' or $C_h''$.

The above embodiment shows that to compensate the waveform distortion, the tap coefficients Ch' or $C_h''$ is directly used instead of the tap coefficient $C_h$ for the convolutional operation in the waveform-distortion compensation device. However, the present invention is not limited to this case, but also covers the following method. In the method, tap coefficients $J_h=(C_h''-C_h)$ and $j_h=(C_h''-C_h)$ corresponding to the differences between the normal echo response and the distorted echo response are stored in the device. In the device, in addition to the general convolutional operation of the linear echo canceller using $C_h$, another convolutional operation for the distortion is carried out with the tap coefficient $J_h$ or $j_h$.

Figure 9:
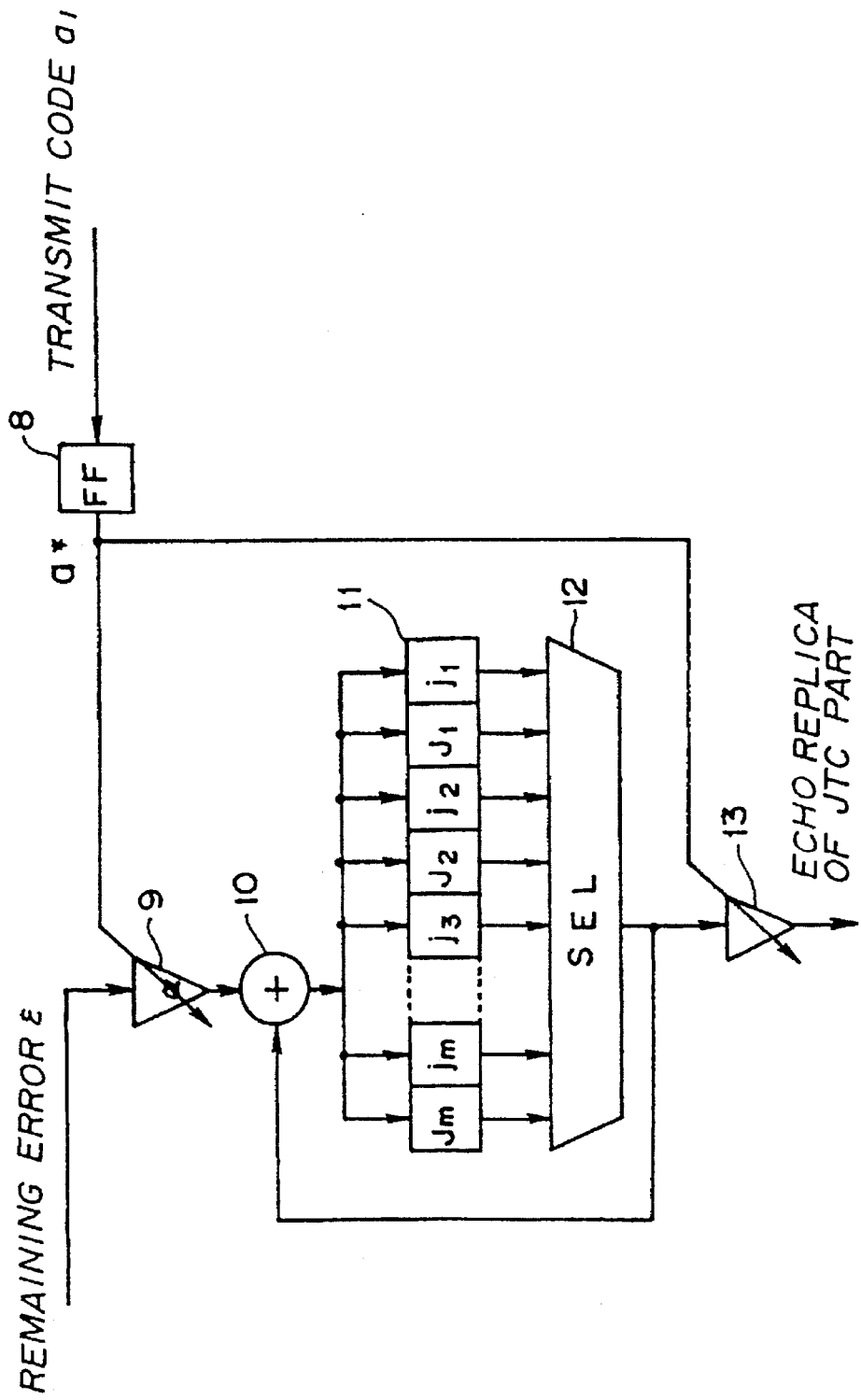
FIG. 9 shows a schematic diagram of a second embodiment of the waveform-distortion compensation device according to the present invention in a case of compensating the waveform distortion by using tap coefficients $Jh'$ and $j_h''$ corresponding to the differences between a normal echo response and a distorted echo response.

FIG. 9 shows a schematic diagram of a second embodiment of the waveform-distortion compensation device according to the present invention for compensating the waveform distortion by using the tap coefficients $J_h'$ and $j_h''$ corresponding to the differences between the normal echo response and the distorted echo response. In this drawing, though only the waveform-distortion compensation device (JTC) part is represented, the total echo canceller is constructed with that device (JTC) and the linear echo canceller part (not shown), because the waveform-distortion compensation device can be operative independently of the linear echo canceller part. The linear echo canceller generates the echo replica for the non-distorted echo response. The waveform-distortion compensation device shown in FIG. 9 generates an echo replica for the distorted echo response. Both of the echo replicas are combined to cancel the echo which has come into the received signal.

In FIG. 9, a latch circuit 8 latches the transmit code $a_1$, which is constructed with a flip-flop circuit. The latch circuit 8 latches the transmit code $a_1$ at the instant the transmit code was distorted due to the jitter of the transmit clock during m sampling periods. Hereinafter, the transmit code having the waveform distortion is represented by a*.

A coefficient memory 11 stores the tap coefficients for the waveform-distortion compensation, more specifically, stores tap coefficients $J_1$ to $J_m$, and $j_1$ to $j_m$ corresponding to the differences between the normal echo response and the distorted echo response. The sampling period m is a value corresponding to a tap in which the distorted echo response is decreased to be negligible. A selector 12 selects one of the tap coefficients $J_h$ and $j_h$ according to the direction of the jitter. The selector 12 starts to select the tap coefficient after the jitter occurs in the transmit clock and increases the tap number of the tap coefficient at each sampling period.

A multiplier 13 multiplies the transmit code a* latched in the latch circuit 8 with the tap coefficient $J_h$ or $j_h$ selected in the selector 12 to generate the echo replica for the waveform-distortion compensation. A multiplier 9 and an adder 10 are used for updating the tap coefficient. The multiplier 9 multiplies the transmit code a* with a remaining error ε and a constant value (step gain) α. The adder 10 adds the multiplied value α×a*×ε to the selected one of the tap coefficients $J_h$ and $j_h$ in the selector 12 to update the tap coefficient. The updated tap coefficient $J_h$ or $j_h$ replaces the latest tap coefficient $J_h$ or $j_h$ which is stored in the coefficient memory 11.

Figure 10:
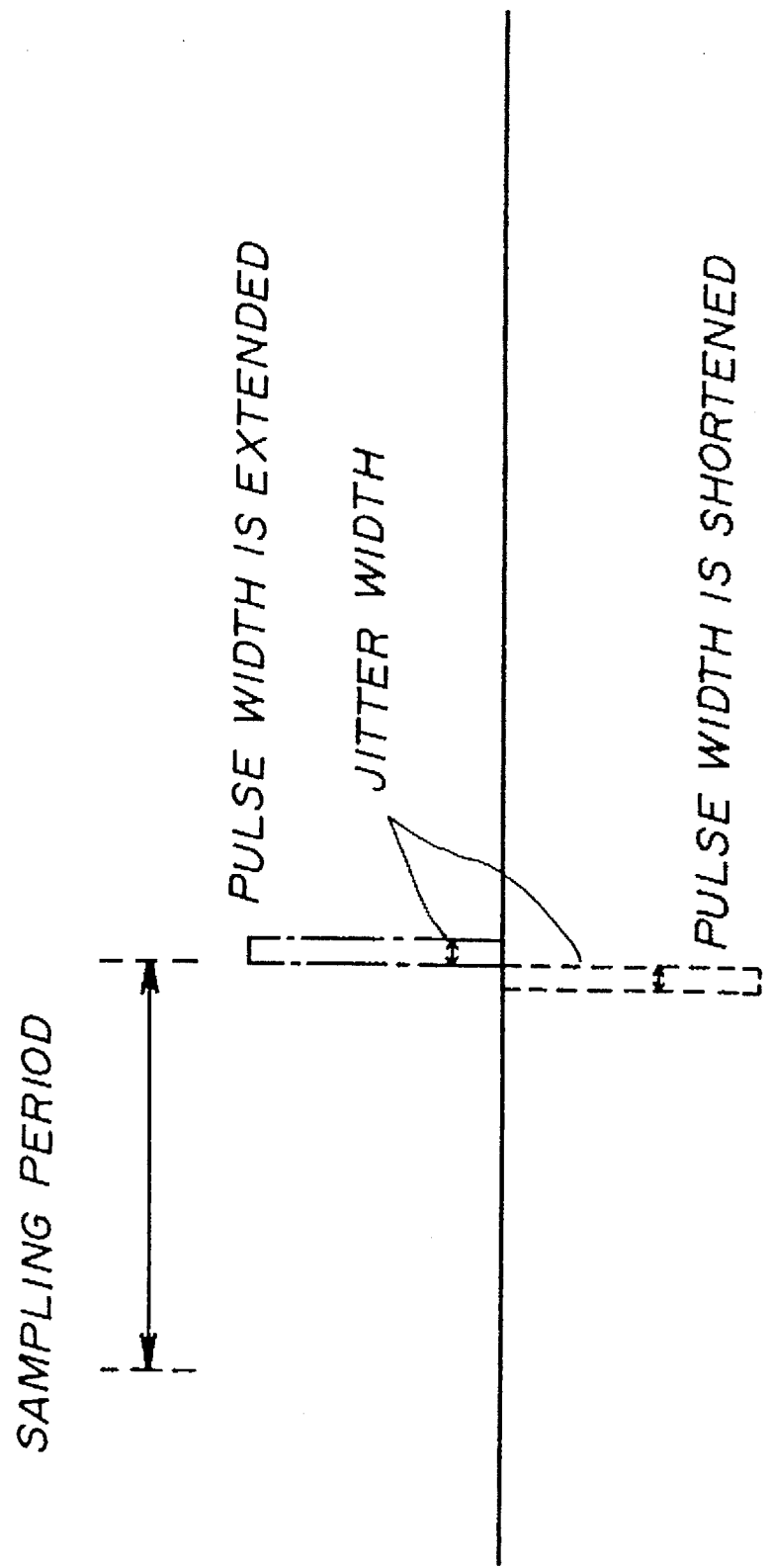
FIG. 10 shows differential waveforms between an output of a D/A converter when no jitter occurs and that when the jitter occurs.

Next, a further detailed description will be given of the operation of the waveform-distortion compensation device shown in FIG. 9. The transmit waveform shown in FIG. 5 which has been distorted by the jitter of the transmit clock is regarded as the normal transmit waveform when no jitter occurs to which the distortion component generated by the jitter in the transmit clock is added. FIG. 10 shows differential waveforms between an output of the D/A converter when no jitter occurs and that when jitter occurs. In FIG. 10, the dotted line shows the differential waveform when the pulse width of the transmit signal is shortened and the one-dotted chain line shows the differential waveform when the pulse width of the transmit signal is extended. Both differential waveforms occur at different times according to the direction of the jitter, and have the opposite codes. Each width of the differential waveforms is identical to the jitter width. Therefore, the transmit waveform (shown in the dotted line or the one-dotted chain line) shown in FIG. 5 which has been distorted is regarded as the normal transmit waveform (shown in the solid line in FIG. 5) to which the waveform shown in FIG. 10 is added.

Figure 11:
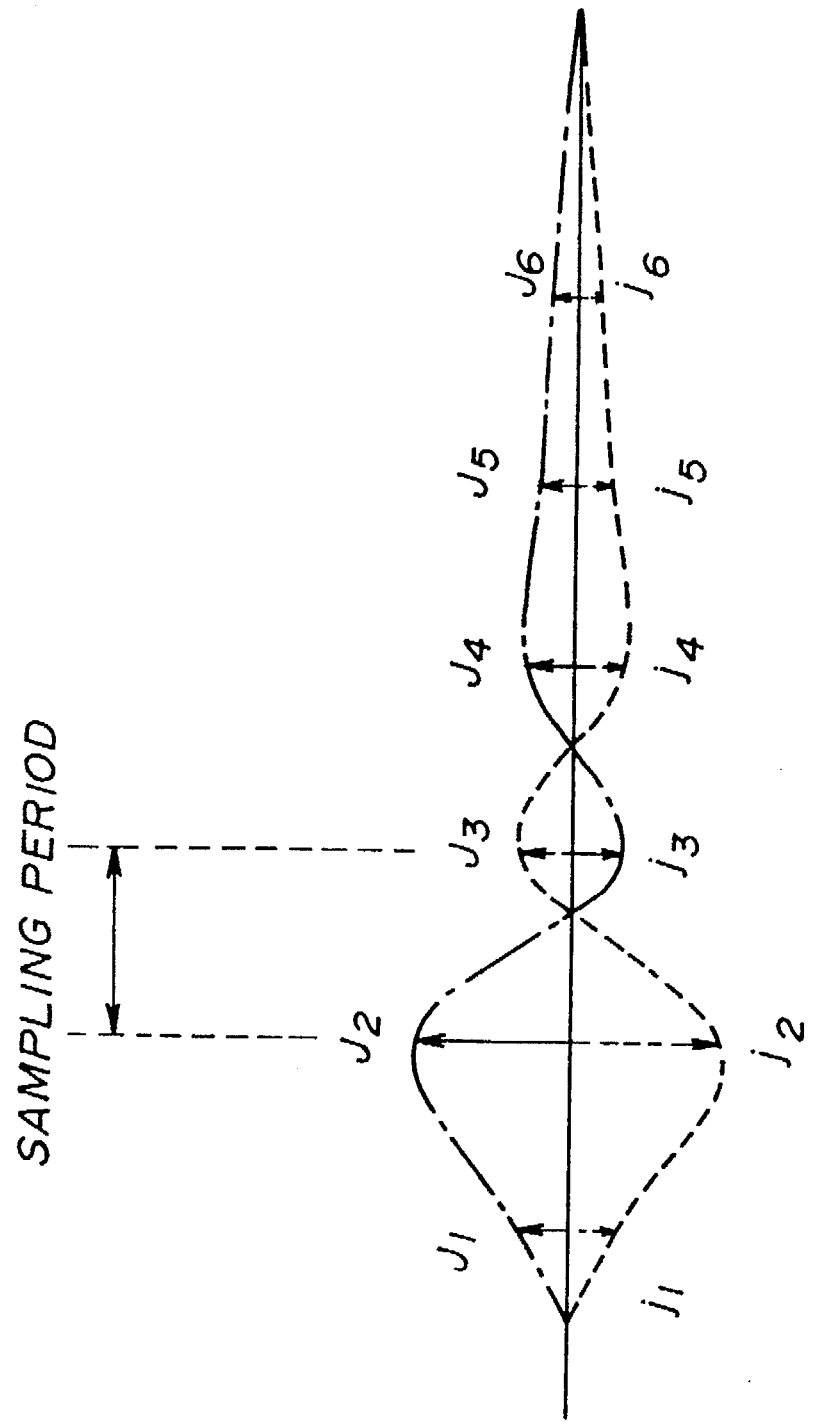
FIG. 11 shows echo responses of the differential waveforms shown in FIG. 10.

As a result, the echo response of the distorted transmit waveform due to the jitter in the transmit clock is also regarded as the summation of the echo response of the normal transmit waveform (shown in the solid line in FIG. 5) when no jitter occurs and the echo response of the differential waveform shown in FIG. 10. FIG. 11 shows echo responses of the differential waveforms shown in FIG. 10. In FIG. 11, the echo responses of the differential waveforms have the opposite codes. The dotted line shown in FIG. 11 shows the echo response of the differential waveform shown in the dotted line in FIG. 10, and amplitudes at respective sampling points are given by $j_1, j_2, \ldots j_6, \ldots$ The one-dotted chain line shown in FIG. 11 shows the echo response of the differential waveform shown in the one-dotted chain line in FIG. 10, and amplitudes at respective sampling points are given by $J_1, J_2, \ldots J_6, \ldots$ Accordingly, the echo replica for compensating the waveform distortion is generated by using $j_1, j_2, \ldots j_6, \ldots$ or $J_1, J_2, \ldots J_6, \ldots$ as the tap coefficients, and is added to the echo replica generated in the general linear echo canceller. This permits the waveform-distortion compensation.

Next, a detail description will be given of the waveform-distortion compensation device shown in FIG. 9. When jitter occurs in the transmit clock, the transmit code $a_1$ is latched in the latch circuit 8. This transmit code $a_1$ is produced from the latch circuit 8 as the distorted transmit code a* (equal to the previous $a_k$). The selector 12 starts to select the tap coefficient $J_h$ or $j_h$ according to the direction of the jitter after the jitter of the transmit clock occurs. The selector 12 increases the tap number of the tap coefficient to be selected from the first tap to the m-th tap for each cycle (sampling period) after the waveform distortion occurs. Accordingly, from the selector 12, according to the direction of the jitter, one of the tap coefficient groups $J_1$ to $J_m$ and $j_1$ to $j_m$ is selected and sequentially produced.

The convolutional operation in the multiplier 13 is carried as follows:

in the case when the pulse width of the transmit code is extended, echo replica=$a^* \times J_k$, in the case when the pulse width of the transmit code is shortened, echo replica=$a^* \times j_k$, where k is the cycle number (the number of the sampling period) after the distortion of the transmit waveform occurs. The above operation is sequentially carried out from k=1 to k=m, and the echo replica for the waveform distortion component is provided.

At the same time, the tap coefficients are updated in the multiplier 9 and the adder 10 as follows:

in the case when the pulse width of the transmit code is extended, $$J_k = J_k + \alpha \times a^* \times \epsilon,$$

in the case when the pulse width of the transmit code is shortened, $$j_k = j_k + \alpha \times a^* \times \epsilon,$$

where k is the cycle number (the number of the sampling period) after the distortion of the transmit waveform occurs. The updated tap coefficients replace the latest tap coefficients in the coefficient memory 11.

The above operations are carried out after the jitter occurs in the transmit clock until the m-th sampling period when the waveform distortion component decreases to become negligible, and is stopped after the m-th sampling period. As a result, the echo replica for the waveform distortion component is provided, and is added to the echo replica generated in the conventional linear echo canceller to compensate the waveform distortion.

In the above second embodiment, the differential waveforms from the D/A converter occur at the different times according to the direction of the jitter, and the corresponding echo responses (for the waveform distortion component) has the opposite codes ±. In some cases, the echo responses for the waveform distortion component are shifted, and the amplitudes (absolute values) of the echo responses are different. Therefore, in this case, it is necessary to store the two kinds of tap coefficients $J_h$ and $j_h$ in the coefficient memory 11. However, when the jitter width is narrow, a first-order approximation that $J_n = -j_n$ may be appropriate. Therefore, in the case of the narrow jitter width, the waveform-distortion compensation device may have the tap coefficient $J_h$ only, which is used to the convolutional operation by multiplying itself with +1 or −1 according to the direction of the jitter. Accordingly, the tap coefficient to be stored in the coefficient memory can be a single set, so as to permit a reduction in memory capacity.

Figure 12:
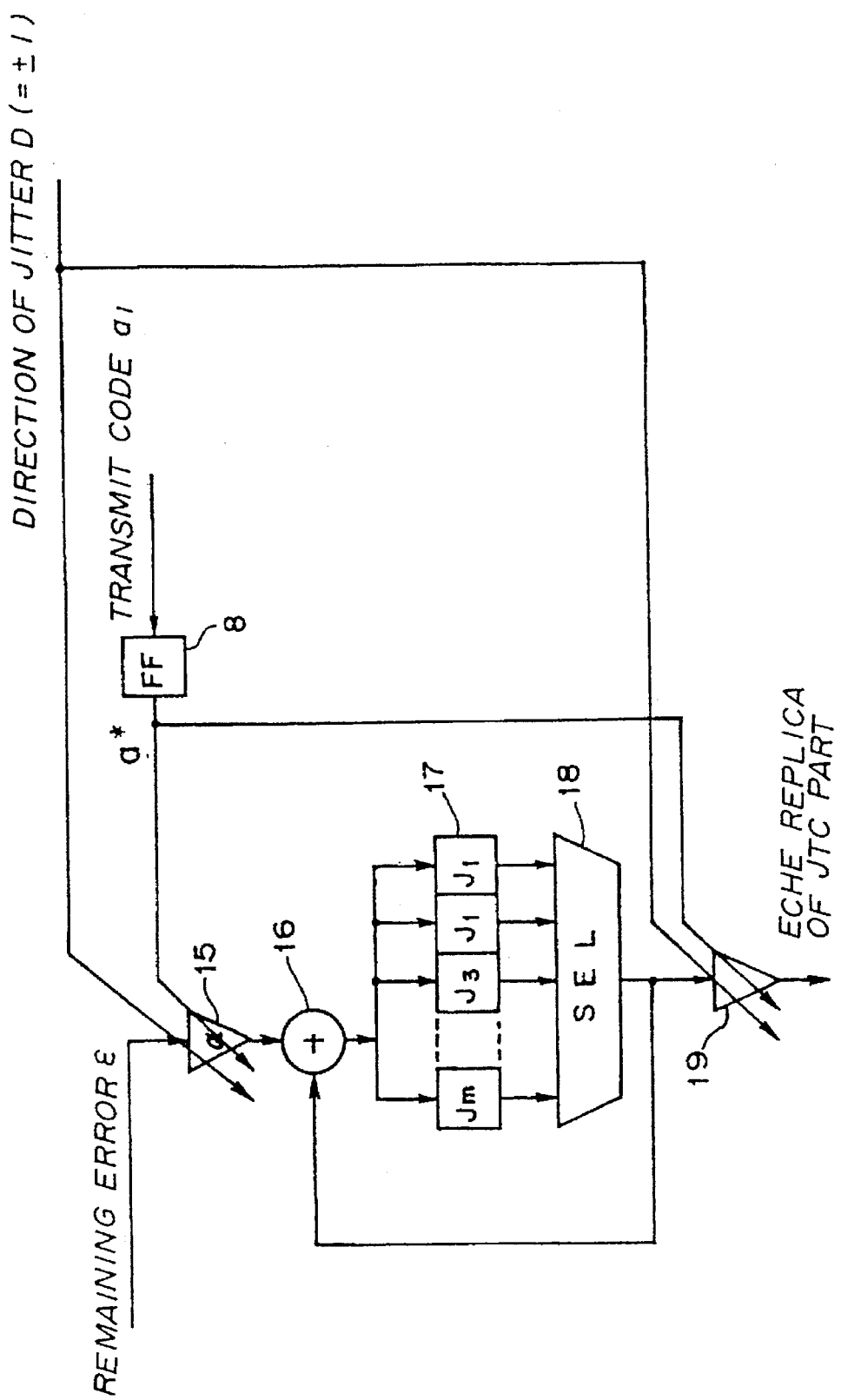
FIG. 12 shows a schematic diagram of a third embodiment of the waveform-distortion compensation device according to the present invention.

FIG. 12 shows a schematic diagram of a third embodiment of the waveform-distortion compensation device according to the present invention. In this embodiment, the capacity of the coefficient memory is reduced. This embodiment is applicable when the jitter width of the transmit code is narrow, in which even if the sampling point of the waveform distortion is shifted by one jitter width, it may be negligible.

In the third embodiment, a coefficient memory 17 stores only the tap coefficients $J_1$ to $J_m$ for the echo response of the differential waveform when the jitter occurs in the forward direction of the transmit code. A selector 18 selects these tap coefficients sequentially. Multipliers 15, 19, which have the same functions as that of the multipliers 9, 13, further comprise a function multiplying with D=+1 when the pulse width of the transmit code is extended or D=−1 when the pulse width thereof is shortened according to the direction of the jitter in the convolutional operation and the tap-coefficient updating operation. The above is different from the second embodiment shown in FIG. 9.

The convolutional operation in the multiplier 19 is carried out as follows:

echo replica=$a^* \times J_k \times D$, where D is +1 or −1 according to the direction of the jitter, and k is the cycle number after the distortion of the transmit waveform occurs.

The tap coefficients are updated in the multiplier 15 and the adder 16 as follows:

$$J_k = J_k + \alpha \times a^* \times \epsilon \times D,$$

where D is +1 or −1 according to the direction of the jitter, and k is the cycle number after the distortion of the transmit waveform occurs.

In the above, descriptions have been given of the configurations and detail operation of the three embodiments. The present invention is not limited to these embodiments. In the following, another embodiment according to the present invention will be described.

There is a waveform-distortion compensation device which has a conventional transversal-type filter of m taps which stores the tap coefficients $J_1$ to $J_m$ or $j_1$ to $j_m$ for the differential waveform between the normal waveform and the distorted waveform. In this embodiment, when the waveform distortion occurs, only the transmit code which has been distorted is applied to a tap sequence of the transversal-type filter and is sequentially shifted. In the transversal-type filter, only the tap which is not zero is operated, and this may provide the echo replica for waveform-distortion compensation.

In the embodiments shown in FIGS. 9 and 12, as mentioned before, the transmit code $a^*$ at the time when the waveform distortion occurs is latched in the latch circuit 8. There is another waveform-distortion compensation device comprising a selector to select the transmit code $a^*$ (namely the previously mentioned $a_k$) from the outputs of the tap sequence of the linear echo canceller generating the echo replica for the normal echo, instead of using the latch circuit 8. In this embodiment, the transmit code $a_k$ at the time when the waveform distortion occurs is always selected in the selector. By using the transmit code $a_k$ and the tap coefficients $J_1$ to $J_m$ or $j_1$ to $j_m$, the echo replica for the waveform-distortion compensation may be provided.

In the first embodiment shown in FIG. 7, the tap coefficients $C_1'$ to $C_m'$ or $C_1''$ to $C_m''$ for the distorted echo response are stored in the coefficient memory. In still another waveform-distortion compensation device storing the tap coefficients $J_1$ to $J_m$ and $j_1$ to $j_m$ for the echo responses of the differential waveforms, and when compensating the waveform distortion, calculates to produce the tap coefficients $C_1'$ to $C_m'$ or $C_1''$ to $C_m''$ by using the tap coefficients $J_1$ to $J_m$ or $j_1$ to $j_m$ and the tap coefficients $C_1$ to $C_m$ for the normal echo response which does not have jitter.

In these embodiments, the tap coefficients are stored in the coefficient memory for storing only the tap coefficients.

However, the tap coefficients with coefficients of other blocks may be stored in a RAM. When operational delay of the other blocks is large, the convolutional operation and the tap-coefficient updating operation in the waveform-distortion compensation device may be carried out at different sampling periods, respectively.

As described above, the present inventions have the following features.

According to the echo canceller, it permits the transmit signal to be distorted by the jitter of a transmit clock, etc., and the waveform distortion of the echo response when the transmit signal is distorted may be compensated. Therefore, this makes it possible to simplify a transmission circuit.

Since an operation of the waveform-distortion compensation device is the same as that of the linear echo canceller, the same operation circuit may be used for both operations. Therefore, additional circuitry for providing the echo canceller including the waveform-distortion compensation device may be small.

Further, the present invention is not limited to these embodiments, but various variations and modifications may be made without departing from the scope of the present invention.

What is claimed is:

1. An echo canceller for generating an echo replica based on a transmit signal to cancel an echo, said echo canceller comprising:

linear echo canceller means for generating a first echo replica to be cancelled from an output signal from a sampler, the first echo replica corresponding to a first sampling value of an echo response waveform when no transmit clock jitter on a transmit side occurs and when no sampling clock jitter on a receive side occurs;

phase compensation means for generating a second echo replica to be cancelled from the output signal from said sampler, the second echo replica corresponding to a second sampling value of an echo response waveform when sampling clock jitter occurs on the receive side, and, thus a sampling clock phase is shifted; and waveform-distortion compensation means, coupled with said linear echo canceller means, for generating a third echo replica to be cancelled from the output signal from said sampler, the third echo replica corresponding to a third sampling value of an echo response waveform when the transmit clock jitter on the transmit side occurs, and, thus a transmit signal and the echo response waveform are distorted.

2. The echo canceller as claimed in claim 1, wherein said echo canceller further comprises subtracting means for subtracting the first echo replica generated in the linear echo canceller means and the third echo replica generated in the waveform-distortion compensation means from the echo.

3. The echo canceller as claimed in claim 1, wherein said waveform distortion compensation means comprises:

distortion-tap-coefficient storage means for storing a set of tap coefficients for a distorted echo response due to the transmit clock jitter; and selection means for replacing a tap coefficient of said linear echo canceller means in a tap through which the transmit signal when the transmit clock jitter occurs transits in series-connected taps in said linear echo canceller means, with a corresponding one of said tap coefficients stored in said distortion-tap-coefficient storage means so as to permit convolutional operation and a coefficient updating operation.

4. The echo canceller as claimed in claim 3, wherein said set of tap coefficients stored in said distortion-tap-coefficient storage means comprises a set of tap coefficients for a pulse width of the transmit signal which is extended due to the transmit clock jitter and a set of tap coefficients for a pulse width of the transmit signal which is shortened due to the transmit clock jitter.

5. The echo canceller as claimed in claim 3, wherein said echo canceller further comprises subtracting means for subtracting the first echo replica generated in the linear echo canceller means and the third echo replica generated in the waveform-distortion compensation means from the echo.

6. The echo canceller as claimed in claim 1, wherein said waveform-distortion compensation means comprises:

differential tap-coefficient storage means for storing a set of differential tap coefficients which differentiate between a distorted echo response waveform when the transmit signal is distorted and a normal echo response waveform generated in the absence of distortion in the transmit signal;

differential replica generation means for generating, when compensating the waveform distortion of the echo response waveform, a differential echo replica for a distortion component of the echo response waveform by use of said differential tap-coefficient storage means; and adding means for adding said differential echo replica to said first echo replica generated in said linear echo canceller means to generate an echo replica for compensating the waveform distortion of the echo response waveform due to the transmit clock jitter.

7. The echo canceller as claimed in claim 6, wherein said waveform-distortion compensation means further comprises latch means for latching the transmit signal when the transmit clock jitter occurs; and said differential replica generation means comprises:

selection means for sequentially selecting the differential tap coefficients stored in said differential tap-coefficient storage means according to an elapsed time after the waveform distortion occurs due to the transmit clock jitter; and operation means for sequentially performing a convolutional operation and a coefficient updating operation for the transmit signal latched in said latch means by using the differential tap coefficients selected in the selection means to generate said differential echo replica.

8. The echo canceller as claimed in claim 6, wherein said set of differential tap coefficients stored in said differential tap-coefficient storage means comprises a set of differential tap coefficients for a pulse width of the transmit signal which is extended due to the transmit clock jitter and a set of differential tap coefficients for a pulse width of the transmit signal which is shortened due to the transmit clock jitter.

9. The echo canceller as claimed in claim 6, wherein said set of differential tap coefficients stored in said differential tap-coefficient storage means is one of a set of differential tap coefficients for a pulse width of the transmit signal which is extended due to the transmit clock jitter and a set of differential tap coefficients for a pulse width of the transmit signal which is shortened due to the transmit clock jitter, the non-stored one of the two sets of differential tap coefficients being generated by inverting codes of the differential tap coefficients stored in said differential tap-coefficient storage means.

10. The echo canceller as claimed in claim 6, wherein said echo canceller further comprises subtracting means for subtracting the first echo replica generated in the linear echo canceller means and the third echo replica generated in the waveform-distortion compensation means from the echo.

11. The echo canceller as claimed in claim 6, wherein a number of taps in said waveform-distortion compensation means is equal to a number of taps in which a distortion component of the echo response waveform is decreased.

12. A waveform-distortion compensation device, to be coupled with an echo canceller, for compensating waveform distortion of an echo response waveform when a transmit clock jitter on a transmit side occurs, whereby a transmit signal and the echo response waveform is distorted, said device comprising:

differential tap-coefficient storage means for storing a set of differential tap coefficients which differentiate between a distorted echo response waveform when the transmit signal is distorted and a normal echo response waveform generated in the absence of distortion in the transmit signal; and differential replica generation means for generating, when compensating the waveform distortion of the echo response waveform, a differential echo replica for a distortion component of the echo response waveform by use of said differential tap-coefficient storage means.

13. The waveform-distortion compensation device as claimed in claim 12, wherein said waveform-distortion compensation device further comprises latch means for latching the transmit signal when the transmit clock jitter occurs; and said differential replica generation means comprises:

selection mean for sequentially selecting the differential tap coefficients stored in said differential tap-coefficient storage means according to an elapsed time after the waveform distortion occurs due to the transmit clock jitter; and operation means for sequentially performing a convolutional operation and a coefficient updating operation for the transmit signal latched in said latch means by using the differential tap coefficients selected in the selection means to generate said differential echo replica.

* * * * *